United States Patent
Hou et al.

(10) Patent No.: US 11,102,084 B2
(45) Date of Patent: Aug. 24, 2021

(54) FAULT RECTIFICATION METHOD, DEVICE, AND SYSTEM

(71) Applicant: Huawei Technologies Co., Ltd., Shenzhen (CN)

(72) Inventors: Jie Hou, Beijing (CN); Yuezhong Song, Beijing (CN); Chengyong Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 16/456,679

(22) Filed: Jun. 28, 2019

(65) Prior Publication Data

US 2019/0386893 A1 Dec. 19, 2019

Related U.S. Application Data

(63) Continuation of application No. PCT/CN2016/113848, filed on Dec. 30, 2016.

(51) Int. Cl.
*H04L 12/24* (2006.01)
*G06F 11/14* (2006.01)

(52) U.S. Cl.
CPC .......... *H04L 41/30* (2013.01); *G06F 11/1425* (2013.01); *G06F 11/1438* (2013.01); *G06F 11/1471* (2013.01); *H04L 41/069* (2013.01)

(58) Field of Classification Search
CPC .... H04L 41/30; H04L 41/069; G06F 11/1425; G06F 11/1438
See application file for complete search history.

(56) References Cited

U.S. PATENT DOCUMENTS

| | | | |
|---|---|---|---|
| 7,558,883 B1 * | 7/2009 | Lamport | G06F 11/142 709/248 |
| 9,507,843 B1 | 11/2016 | Madhavarapu et al. | |
| 9,983,954 B2 * | 5/2018 | Rahut | G06F 11/2007 |

(Continued)

FOREIGN PATENT DOCUMENTS

| | | |
|---|---|---|
| CN | 103152434 A | 6/2013 |
| CN | 103763155 A | 4/2014 |
| CN | 103793517 A | 5/2014 |

(Continued)

OTHER PUBLICATIONS

Machine Translation and Abstract of Chinese Publication No. CN103152434, Jun. 12, 2013, 10 pages.

(Continued)

*Primary Examiner* — Suraj M Joshi
(74) *Attorney, Agent, or Firm* — Conley Rose, P.C.

(57) ABSTRACT

A distributed cluster system includes at least a first node, a second node, and a third node, where the first node and the second node have a latest log before a fault occurs, but the third node does not have the latest log before the fault occurs. A fault rectification method includes: setting, by the first node after the first node restarts due to the fault, a voting status of the first node to Voting Not Allowed, where the voting status is used to indicate whether the first node can vote in a process in which the distributed cluster system elects a leader; receiving a replicated-log-entry message from the second node; and setting the voting status of the first node to Voting Allowed, where the second node is a leader.

20 Claims, 9 Drawing Sheets

(56) References Cited

U.S. PATENT DOCUMENTS

2005/0132154 A1* 6/2005 Rao .................. H04L 67/322
          711/162
2018/0260125 A1* 9/2018 Botes .................. G06F 3/067

FOREIGN PATENT DOCUMENTS

| CN | 104994168 A | 10/2015 |
|----|-------------|---------|
| CN | 105511987 A | 4/2016 |
| CN | 105512266 A | 4/2016 |

OTHER PUBLICATIONS

Machine Translation and Abstract of Chinese Publication No. CN105511987, Apr. 20, 2016, 10 pages.
Machine Translation and Abstract of Chinese Publication No. CN105512266, Apr. 20, 2016, 22 pages.
Foreign Communication From a Counterpart Application, PCT Application No. PCT/CN2016/113848, English Translation of International Search Report dated Oct. 10, 2017, 2 pages.
Foreign Communication From a Counterpart Application, PCT Application No. PCT/CN2016/113848, English Translation of Written Opinion dated Oct. 10, 2017, 4 pages.
198.169.189.229: "Raft (algorithm)," Wikipedia, Dec. 17, 2015, Retrieved from the Internet: URL:https://en.wikipedia.org/w/index. php?%20title=Raft_(algorithm)andoldid=695678913%20[retrieved%20on%202021-04-07], 4 pages.

* cited by examiner

FAULT RECTIFICATION METHOD, DEVICE, AND SYSTEM

CROSS-REFERENCE TO RELATED APPLICATIONS

This application is a continuation of International Application No. PCT/CN2016/113848, filed on Dec. 30, 2016, the disclosure of which is hereby incorporated by reference in its entirety.

TECHNICAL FIELD

Embodiments of the present disclosure relate to the communications field, and in particular, to a fault rectification method, device, and system.

BACKGROUND

A distributed system is a system model in which components are located on network-connected computers and communication between the components and coordination of operations of the components are implemented by means of message transfer. The components interact with each other to achieve a common goal. Component concurrency is one of remarkable features of the distributed system. Strong consistency is one of consistency models used in the field of concurrent programming (for example, a distributed shared memory or a distributed transaction). A requirement of strong consistency is: All concurrent processes (or nodes, processors, or the like) see all access in a same order. A Raft algorithm is a typical algorithm used to ensure strong consistency. The algorithm is applied to an industry mainstream distributed controller system, such as an OpenDaylight (ODL) platform and an Open Network Operating System (ONOS).

In the Raft algorithm, a consistency problem is classified into three sub-problems: leader election, log replication, and security assurance. In the Raft algorithm, an operation instruction from a client is converted into a log, the log (used as a basis for subsequent rectification after a system fault occurs) is first stored, and consistency synchronization is performed according to the log. Then, after synchronization succeeds, a server marks the log as a committed state (the committed state indicates that the log already has consistency in the system, and when more than half of servers in the system have stored the log, consistency can be ensured), and executes the operation instruction. An order in which logs are marked as a committed state is an order in which instructions are executed. By means of a Raft algorithm process, it is ensured that orders in which logs of all servers in a Raft cluster are committed are kept the same.

However, in a distributed system that includes at least three nodes, when a quantity of nodes that have a latest log and that are included in the distributed system possibly causes a problem that a node that does not have the latest log is elected as a leader after one of the nodes that have the latest log restarts due to a fault, a problem that the latest log is lost may be caused, reducing security of the distributed system.

SUMMARY

A fault rectification method, device, and system provided in embodiments of the present disclosure resolve a problem of a loss of a latest log that may be caused when a quantity of nodes that have the latest log and that are included in the distributed cluster system possibly causes a problem that a node that does not have the latest log is elected as a leader after one of the nodes that have the latest log restarts due to a fault.

To resolve the foregoing problem, a first aspect of the embodiments of the present disclosure provides a fault rectification method, applied to a distributed cluster system, where a quantity of nodes that have a latest log and that are included in the distributed cluster system possibly causes a problem that a node that does not have the latest log is elected as a leader after one of the nodes that have the latest log restarts due to a fault. The distributed cluster system includes at least a first node, a second node, and a third node, the first node and the second node have the latest log before the fault occurs, the third node does not have the latest log before the fault occurs. The method includes: setting, by the first node after the first node restarts due to the fault, a voting status of the first node to Voting Not Allowed, where the voting status is used to indicate whether the first node can vote in a process in which the distributed cluster system elects a leader; receiving, by the first node, a replicated-log-entry message from the second node; and setting the voting status of the first node to Voting Allowed, where the second node is a leader.

Setting the voting status of the first node that restarts due to the fault to Voting Not Allowed ensures that the third node that does not have the latest log before the fault occurs cannot be elected as a leader in leader election of a Raft cluster, and that the second node that has the latest log before the fault occurs can be elected as the new leader, such that the latest log before the fault occurs can be released (or synchronized) to another node in the Raft cluster, and the latest log before the fault occurs is not lost in the Raft cluster, thereby improving security of the Raft cluster.

In a first possible implementation of the first aspect, the second node is a leader of the distributed cluster system before the first node restarts due to the fault.

The leader of the distributed cluster system sends, before the first node restarts due to the fault, the replicated-log-entry message to the first node, such that a voting right of the first node is restored. This ensures that if the distributed cluster system does not perform a new round of leader election when the first node restarts due to the fault, the system can still operate normally, further improving security of the system.

In a second possible implementation of the first aspect, the second node is a new leader elected by the distributed cluster system after the first node restarts due to the fault.

The new leader elected by the distributed cluster system after the first node restarts due to the fault sends the replicated-log-entry message to the first node, such that a voting right of the first node is restored. This ensures that if the distributed cluster system performs a new round of leader election when the first node restarts due to the fault, the system can still operate normally, further improving security of the system.

With reference to the second possible implementation of the first aspect, in a third possible implementation of the first aspect, receiving, by the first node, a replicated-log-entry message from the second node, and setting the voting status of the first node to Voting Allowed includes: the replicated-log-entry message comprises a log entry and first identification information to the replicated-log-entry message, where the first identification information is used to indicate whether the log entry includes a last log before the second node becomes the new leader; and confirming, by the first node according to the first identification information, that the log entry includes the last log before the second node becomes the new leader, storing the log entry, and setting the voting status of the first node to Voting Allowed.

By adding the first identification information to the replicated-log-entry message, the voting right of the first node is restored only after it is ensured that the first node has received the latest log before the fault occurs, thereby avoiding an security risk problem that is caused when the Raft cluster still continues operating because of being unable to identify that the log is already lost.

With reference to the second or the third possible implementation of the first aspect, in a fourth possible implementation of the first aspect, the method further includes: adding the log entry and the first identification information to the replicated-log-entry message, where the first identification information is used to indicate whether the log entry includes the last log before the second node becomes the new leader; confirming, by the first node according to the first identification information, that the log entry does not include the last log before the second node becomes the leader, storing the log entry; and retaining the voting status of the first node as Voting Not Allowed.

The first identification information is used to indicate that the log entry does not include the last log before the second node becomes the leader, such that a normal operation can still be performed when a log other than the latest log before the fault occurs (that is, an old log before the fault occurs) is synchronized according to the replicated-log-entry message.

With reference to any one of the first aspect or the first to the fourth possible implementations of the first aspect, in a fifth possible implementation of the first aspect, the setting, by the first node after the first node restarts due to the fault, a voting status of the first node to Voting Not Allowed includes: after the first node starts up, determining that a reason why a log of the first node is empty is that the restart due to the fault results in a log loss, and setting the voting status to Voting Not Allowed.

The voting status is set to Voting Not Allowed only after it is determined that the reason why a log of the first node is empty is that the restart due to the fault results in a log loss. This ensures that if the system is initializing, the voting status of the first node is not set to Voting Not Allowed, thereby avoiding error occurrence.

With reference to the fifth possible implementation of the first aspect, in a sixth possible implementation of the first aspect, the determining that a reason why a log of the first node is empty is that the restart due to the fault results in a log loss includes: storing, by the first node, second identification information in a non-volatile storage medium, where the second identification information is used to indicate whether the first node has received a first log before from another node in the distributed cluster system or from a client device; and when the first node starts up, confirming, by the first node, that the second identification information indicates that the first node has received before the first log and that a current log of the first node is empty, and determining, by the first node, that the first node loses the log because of the restart due to the fault.

The second identification information is stored in the non-volatile storage medium, such that the embodiments of the present disclosure provide a simpler and more secure method to ensure that the voting status is correctly identified and set, avoiding a case in which the system cannot operate normally due to incorrect identification.

With reference to the sixth possible implementation of the first aspect, in a seventh possible implementation of the first aspect, the method further includes: setting an initial value of the second identification information to false, to indicate that the first node starts up for the first time and has not received the first log from the other node in the distributed cluster system or from the client device; and after the first node has received the first log from the other node in the distributed cluster system or from the client device, setting the second identification information to true, to indicate that the first node has received the first log before.

The second identification information is set to false or true, such that the embodiments of the present disclosure provide a more concise and specific manner of configuring the second identification information.

A second aspect of the embodiments of the present disclosure provides a fault rectification method, applied to a distributed cluster system, where a quantity of nodes that have a latest log and that are included in the distributed cluster system possibly causes a problem that a node that does not have the latest log is elected as a leader after one of the nodes that have the latest log restarts due to a fault, the distributed cluster system includes at least a first node, a second node, and a third node, the first node and the second node have the latest log before the fault occurs, the third node does not have the latest log before the fault occurs, and the method includes: becoming, by the second node, a leader after the first node restarts due to the fault; and sending, by the second node, a replicated-log-entry message to the first node, where the replicated-log-entry message is used to indicate that the first node can vote in leader election.

Setting a voting status of the first node that restarts due to the fault to Voting Not Allowed ensures that the third node that does not have the latest log before the fault occurs cannot be elected as a leader in leader election of a Raft cluster, and that the second node that has the latest log before the fault occurs can be elected as the new leader, such that the latest log before the fault occurs can be released (or synchronized) to another node in the Raft cluster, and the latest log before the fault occurs is not lost in the Raft cluster, thereby improving security of the Raft cluster. In a first possible implementation of the second aspect, the second node is a leader of the distributed cluster system before the first node restarts due to the fault.

The leader of the distributed cluster system before the first node restarts due to the fault sends the replicated-log-entry message to the first node, such that a voting right of the first node is restored. This ensures that if the distributed cluster system does not perform a new round of leader election when the first node restarts due to the fault, the system can still operate normally, further improving security of the system.

In a second possible implementation of the second aspect, the second node is a new leader elected by the distributed cluster system after the first node restarts due to the fault.

The new leader elected by the distributed cluster system after the first node restarts due to the fault sends the replicated-log-entry message to the first node, such that a voting right of the first node is restored. This ensures that if the distributed cluster system performs a new round of leader election when the first node restarts due to the fault, the system can still operate normally, further improving security of the system.

With reference to the second possible implementation of the second aspect, in a third possible implementation of the second aspect, that the replicated-log-entry message is used to indicate that the first node can vote in leader election includes: the replicated-log-entry message includes a log entry and first identification information, where the first identification information is used to indicate whether the log entry includes a last log before the second node becomes the new leader; and when the first identification information indicates that the log entry includes the last log before the second node becomes the leader, the replicated-log-entry message is used to instruct the first node to store the log entry and set the voting status of the first node to Voting Allowed.

By adding the first identification information to the replicated-log-entry message, the voting right of the first node is restored only after it is ensured that the first node has received the latest log before the fault occurs, thereby avoiding an security risk problem that is caused when the Raft cluster still continues operating because of being unable to identify that the log is already lost.

With reference to the third possible implementation of the second aspect, in a fourth possible implementation of the second aspect, the method further includes: when the first identification information indicates that the log entry does not include the last log before the second node becomes the leader, the replicated-log-entry message instructs the first node to store the log entry and not to change the voting status of the first node.

The first identification information is used to indicate that the log entry does not include the last log before the second node becomes the leader, such that a normal operation can still be performed when a log other than the latest log before the fault occurs (that is, an old log before the fault occurs) is synchronized according to the replicated-log-entry message.

With reference to any one of the first to the fourth possible implementations of the second aspect, in a fifth possible implementation of the second aspect, that the second node is a new leader elected by the distributed cluster system after the first node restarts due to the fault includes: after the first node restarts due to the fault, the second node becomes the new leader after obtaining more than half of yes votes in the distributed cluster system, where the more than half of yes votes include a yes vote from the second node itself and a yes vote from the third node, and the second node cannot obtain a yes vote from the first node.

The first node is set to being unable to participate in voting in leader election, such that the third node that does not have the latest log before the fault occurs cannot be elected as a leader, thereby ensuring that the second node that has the latest log before the fault occurs can be smoothly elected as the leader.

With reference to any one of the second aspect or the first to the fifth possible implementations of the second aspect, in a sixth possible implementation of the second aspect, the method further includes: storing, by the second node, second identification information in a non-volatile storage medium, where the second identification information is used to indicate whether the second node has received the first log before from another node in the distributed cluster system or from a client device; setting an initial value of the second identification information to false, to indicate that the second node starts up for the first time and has not received the first log from the other node in the distributed cluster system or from the client device; and after the second node has received the first log from the other node in the distributed cluster system or from the client device, setting the second identification information to true, to indicate that the second node has received the first log before.

The second identification information is stored in the non-volatile storage medium, such that the embodiments of the present disclosure provide a simpler and more secure method to ensure that the voting status is correctly identified and set, avoiding a case in which the system cannot operate normally due to incorrect identification.

According to a third aspect, the present disclosure provides a first network device serving as a first node. The first network device is configured to execute the method according to the first aspect or any possible implementation of the first aspect. The first network device includes a module configured to execute the method according to the first aspect or any possible implementation of the first aspect.

According to a fourth aspect, the present disclosure provides a first network device serving as a first node. The first network device includes a processor, a transmitter, a random access memory, a read-only memory, and a bus. The processor is coupled to the transmitter, the random access memory, and the read-only memory using the bus. When a terminal device needs to be run, the terminal device is started using a basic input/output system built in the read-only memory or using a bootloader boot system in an embedded system, to boot the terminal device to a normal running state. After the first network device enters the normal running state, an application and an operating system run in the random access memory, such that the processor executes the method according to the first aspect or any possible implementation of the first aspect.

According to a fifth aspect, the present disclosure provides a computer readable medium. The computer readable medium is configured to store a computer program, and the computer program includes an instruction used to execute the method according to the first aspect or any possible implementation of the first aspect.

According to a sixth aspect, the present disclosure provides a second network device serving as a second node. The second network device is configured to execute the method according to the second aspect or any possible implementation of the second aspect. The second network device includes a module configured to execute the method according to the second aspect or any possible implementation of the second aspect.

According to a seventh aspect, the present disclosure provides a second network device, serving as a second node. The second network device includes a processor, a transmitter, a random access memory, a read-only memory, and a bus. The processor is coupled to the transmitter, the random access memory, and the read-only memory using the bus. When a terminal device needs to be run, the terminal device is started using a basic input/output system built in the read-only memory or using a bootloader boot system in an embedded system, to boot the terminal device to a normal running state. After the second network device enters a normal running state, an application and an operating system run in the random access memory, such that the processor executes the method according to the second aspect or any possible implementation of the second aspect.

According to an eighth aspect, the present disclosure provides a computer readable medium. The computer readable medium is configured to store a computer program, and the computer program includes an instruction used to execute the method according to the second aspect or any possible implementation of the second aspect.

According to a ninth aspect, a system is provided. The system includes the first network device according to any one of the third aspect to the fifth aspect and the second network device according to any one of the sixth aspect to the eighth aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description merely show some embodiments of the present disclosure, and a person of ordinary skill in the art can derive other implementations of the present disclosure from these accompanying drawings without creative efforts. All of the embodiments or the implementations shall fall within the protection scope of the present disclosure.

DESCRIPTION OF EMBODIMENTS

Figure 1:
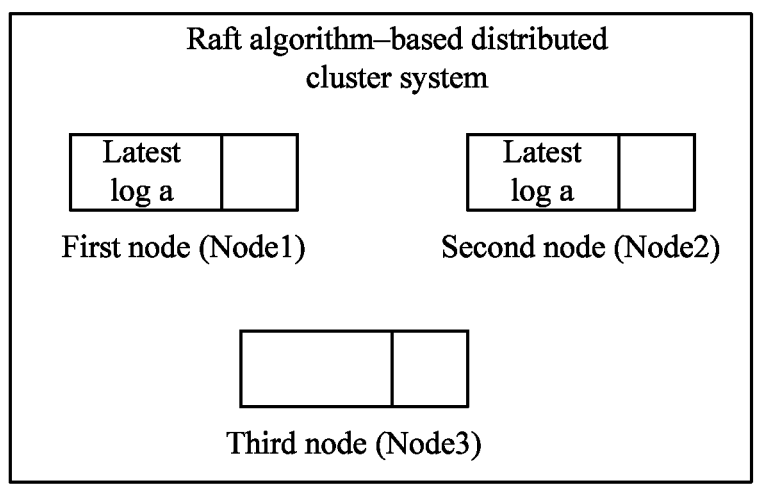
FIG. 1 is a schematic diagram of a distributed system according to an embodiment of the present disclosure.

The technical solutions according to embodiments of the present disclosure are clearly described in the following with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A network architecture and a service scenario described in the embodiments of the present disclosure are intended to describe the technical solutions in the embodiments of the present disclosure more clearly, and do not constitute any limitation on the technical solutions provided in the embodiments of the present disclosure. A person of ordinary skill in the art may understand that with the evolution of network architectures and the emergence of a new service scenario, the technical solutions provided in the embodiments of the present disclosure are also applicable to a similar technical problem.

A distributed system is a system model in which components are located on network-connected computers and communication between the components and coordination of operations of the components are implemented by means of message transfer. The components interact with each other to achieve a common goal. Three remarkable features of the distributed system are component concurrency, lack of a global clock, and an independent fault of a component. The distributed system includes but is not limited to a service-oriented architecture system, a large-scale multi-player online game, a peer-to-peer application, or the like.

Strong consistency is one of consistency models used in the field of concurrent programming (for example, a distributed shared memory or a distributed transaction). A requirement of strong consistency is: All concurrent processes (or nodes, processors, or the like) see all access in a same order. A Raft algorithm is a typical algorithm used to ensure strong consistency. The algorithm is applied to a distributed system, for example, an industry mainstream distributed controller system, such as an OpenDaylight (ODL) platform and an Open Network Operating System (ONOS).

In the Raft algorithm, a consistency problem is classified into three sub-problems: leader election, log replication, and security assurance. In the Raft algorithm, an operation instruction from a client is converted into a log, the log (used as a basis for subsequent rectification after a system fault occurs) is first stored, and consistency synchronization is performed according to the log. After synchronization succeeds, a server marks the log as a committed state (the committed state indicates that the log already has consistency in the system, and when more than half of servers in the system have stored the log, consistency can be ensured), and executes the operation instruction. An order in which logs are marked as a committed state is an order in which instructions are executed. By means of a Raft algorithm process, it is ensured that orders in which logs of all servers in a Raft cluster are committed are kept the same.

The following briefly describes basic terms and concept definitions in the Raft algorithm.

In the Raft algorithm, nodes (for example, servers) in a distributed cluster system are classified into three roles: a leader, a follower, and a candidate. A leader is responsible for processing a client request, and replicating logs to a follower in an order. The follower passively responds to a request, and performs an operation according to different request types and content. A candidate is a role in an intermediate state in a process of changing from a follower to a leader. The leader ensures, using log replication logic, that log committing orders of all followers are the same as a log committing order of the leader.

In the Raft algorithm, a time of each node (for example, a server) in a distributed cluster system is sliced into terms. Each term includes a leader election time and a time in which an elected leader normally performs a leader operation. There is a maximum of one leader in each term. There is no leader in some terms. This is a case in which election fails.

When a distributed cluster system (referred to as a Raft cluster for short below) based on the Raft algorithm begins to start, all nodes in the system start up as followers, and an election timer is started. If an election timer of a follower expires, it is considered that no server serving as a leader exists in the current system, and a new round of election needs to be initiated. After a node is elected as a leader, the server that serves as the leader needs to broadcast a heartbeat to trigger an election timer of another server that serves as a follower, to restart timing. This is a heartbeat and timeout mechanism of the Raft algorithm.

Some status variables related to each node in a Raft cluster include the following: a currentTerm variable, used to identify a term in which a node exists currently; a votedFor variable, where in a leader election process, a node in the Raft cluster uses the votedFor variable to mark a node, in the cluster, selected by the node as a leader in a current term; a lastLogIndex variable, used to identify an index of a last log stored on a node in the Raft cluster, where a log is stored in an array, and the index describes a storage order of logs; and a lastLogTerm variable, used to identify, when a node in the Raft cluster stores a last log, a term in which the node exists.

It should be noted that all the status variables described above are maintained on each node in the Raft cluster. That is, each node itself generates and maintains all the status variables, and the status variables are unique on each node.

The following briefly describes a leader election process in a Raft cluster.

When an election timer of a follower expires, a new round of election needs to be initiated. After the follower itself makes a currentTerm variable increase, the follower changes from a follower to a candidate, sets a votedFor variable to the follower itself, sends a vote request message to all other nodes in the Raft cluster, and performs repetition until any of the following conditions is met.

a. If obtaining votes from more than half of servers in the Raft cluster, the node changes from a candidate to a leader and starts to broadcast a heartbeat.

b. If the node receives a log replication request (the log replication request is also used as a heartbeat message) from an authorized leader, it indicates that a new leader has been generated, and the node itself changes to a follower.

c. If the election expires (the election in this period does not succeed), the node starts a new round of election after making the currentTerm increase.

In addition, a log processed by each node in the Raft cluster may be stored in a non-volatile storage medium, for example, a storage medium in which data is not lost upon a power failure, such as a magnetic disk and a hard disk, or may be stored in a volatile storage medium, for example, a storage medium in which data is lost upon a power failure, such as a memory. To improve data processing efficiency, the nodes do not store log data in a non-volatile storage medium such as a magnetic disk, but choose to store the log data in a volatile storage medium. Both reading and writing of the log data are completed in a memory, and a read/write speed is relatively high.

A Raft cluster includes at least three nodes. When a quantity of nodes that have a latest log and that are included in the distributed system possibly causes a problem that a node that does not have the latest log is elected as a leader after one of the nodes that have the latest log restarts due to a fault, a problem that the latest log is lost may be caused. For example, the quantity of nodes that have the latest log may be M. M is a result of rounding $$\frac{N}{2}+1$$

down to a nearest integer, N is a quantity of nodes in the Raft cluster, and N is an odd number greater than or equal to 3. For example, as shown in FIG. 1, a Raft cluster has three nodes (N=3): a first node (Node1), a second node (Node2), and a third node (Node3). In this case, $$\frac{N}{2}+1=\frac{3}{2}+1=2.5.$$

It is required to directly remove a decimal part of 2.5 to obtain 2 (that is, rounding down to a nearest integer). That is, two nodes (for example, the Node1 and the Node2) each have a latest log a, and the latest log has not been synchronized to another node (for example, the Node3). In a scenario in which logs are stored in a volatile storage medium, if either the Node1 or the Node2 restarts due to a fault, the latest log a is lost. In a process of re-electing a leader, the Node3 that does not store the latest log a may become a new leader by means of election. The new leader (the Node3) synchronizes its log to other nodes such as the Node1 and the Node2. Because the Node3 does not store the latest log a, the latest log a is not synchronized to the other nodes, resulting in a problem that the latest log a is lost and the Raft cluster is not secure.

Based on this scenario, the following separately describes the problem using two cases in which the foregoing node that restarts due to the fault plays a role of a leader or a role of a follower.

Figure 2A:
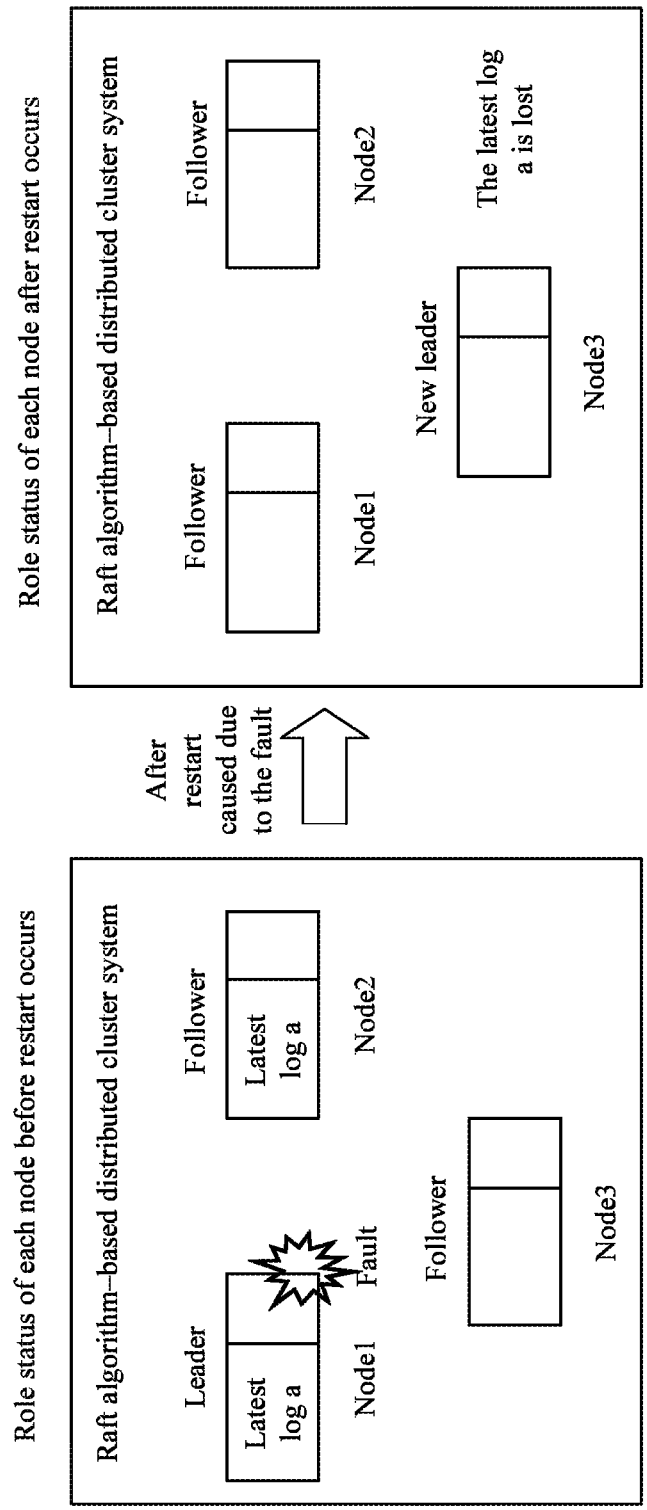
FIG. 2A is a schematic diagram of another distributed system and problem generation according to an embodiment of the present disclosure.

As shown in FIG. 2A, when the Node1 serves as a leader and restarts due to a fault, all logs including the latest log a are lost. In this case, the Node3 begins to apply for being a leader. The Node3 sends a vote request message to both the Node1 and the Node2. The vote request message carries local log information of the Node3. The local log information includes a lastLogIndex (for example, being a positive integer N) and a lastLogTerm (for example, being a positive integer M). Because the Node2 and the Node1 each have stored the latest log a, and the latest log has not been synchronized to the Node3, LastLogIndexes (for example, being N+1) of the Node2 and the Node1 are certainly greater than the LastLogIndex (being N) of the Node3. When receiving the vote request message sent by the Node3, the Node2 compares lastLogIndexes and lastLogTerms of the two nodes Node2 and Node3. If the lastLogTerm of the Node2 is greater, or if the lastLogTerms of the Node2 and the Node3 are the same but the lastLogIndex of the Node2 is greater, it is determined that logs stored by the Node2 itself are more complete, and a vote request is rejected. Likewise, when receiving the vote request message sent by the Node3, the Node1 compares lastLogIndexes and lastLogTerms of the two nodes Node1 and Node3. Because all information related to a log or the like has been lost (log information is empty) after the Node1 restarts, the lastLogIndex or the lastLogTerm of the Node3 is greater. Therefore, it is determined that logs stored by the Node3 are more complete, and the Node1 accepts the vote request and agrees that the Node3 becomes a leader. The Raft cluster has only three nodes, and in this case, the Node3 obtains two yes votes from itself and the Node1, and a quantity of the obtained yes votes is greater than a half of votes (1.5 votes). Therefore, the Node3 is elected as a new leader. The new leader synchronizes its log information to the Node1 and the Node2. However, the Node3 does not store the latest log a. Therefore, the latest log a is lost in the entire Raft cluster, resulting in a problem that the Raft cluster is not secure.

Figure 2B:
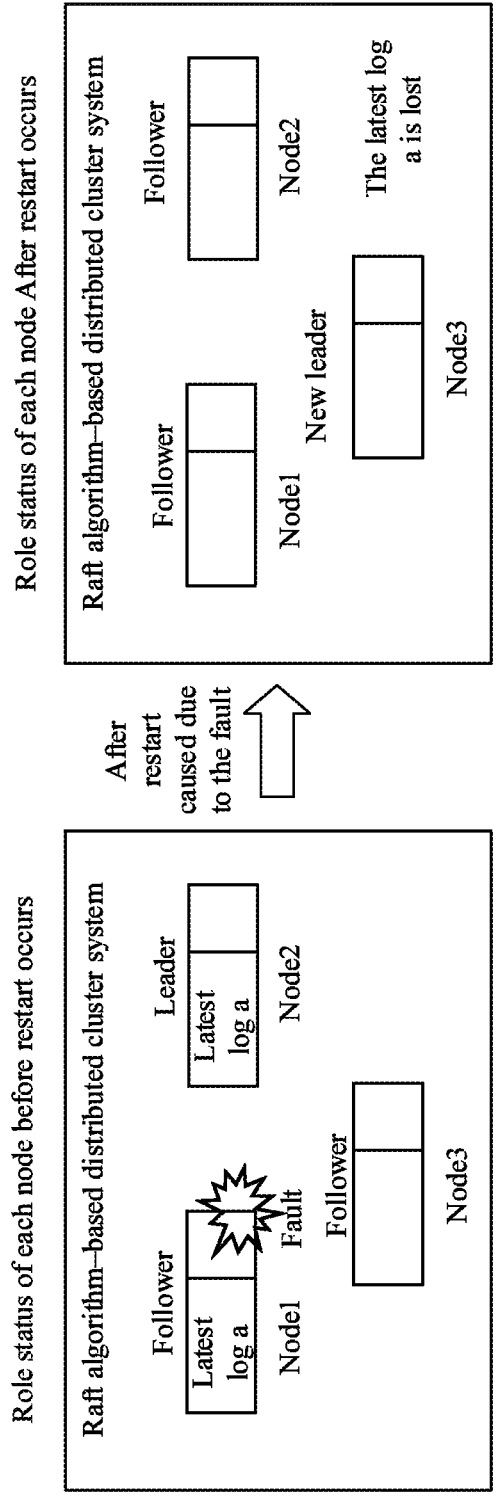
FIG. 2B is a schematic diagram of still another distributed system and problem generation according to an embodiment of the present disclosure.

As shown in FIG. 2B, when the Node1 serves as a follower and is faulty, all logs including the latest log a are lost. After the Node1 restarts, the Raft cluster is exactly in a leader election process. The Node3 sends a vote request message to both the Node1 and the Node2. The vote request message carries local log information of the Node3. The local log information includes a lastLogIndex (for example, being a positive integer N) and a lastLogTerm (for example, being a positive integer M, where M=currentTerm+1). Because all information related to a log or the like has been lost (log information is empty) after the Node1 restarts, the lastLogIndex or the lastLogTerm of the Node3 is greater. Therefore, it is determined that logs stored by the Node3 are more complete, and the Node1 accepts a vote request and agrees that the Node3 becomes a leader. The Node3 also votes yes for itself. The Raft cluster has only three nodes, and in this case, the Node3 obtains two yes votes from itself and the Node1, and a quantity of the obtained votes is greater than a half of votes (1.5 votes). Therefore, the Node3 is elected as a new leader. The new leader synchronizes its log information to the Node1 and the Node2. However, the Node3 does not store the latest log a. Therefore, the latest log a is lost in the entire Raft cluster, resulting in a problem that the Raft cluster is not secure. It should be noted that because the lastLogTerm (being currentTerm+1) of the Node3 is greater than a lastLogTerm (being currentTerm) of the Node2, the Node2 accepts that the Node3 becomes the new leader, and the Node2 changes to a follower state.

It should be further noted that a distributed system and a distributed cluster system that are described in the embodiments of the present disclosure have a same meaning and can be used interchangeably.

The foregoing describes two possible application scenarios to which the present disclosure relates, and on this basis, the following further describes in detail the embodiments of the present disclosure.

Figure 3:
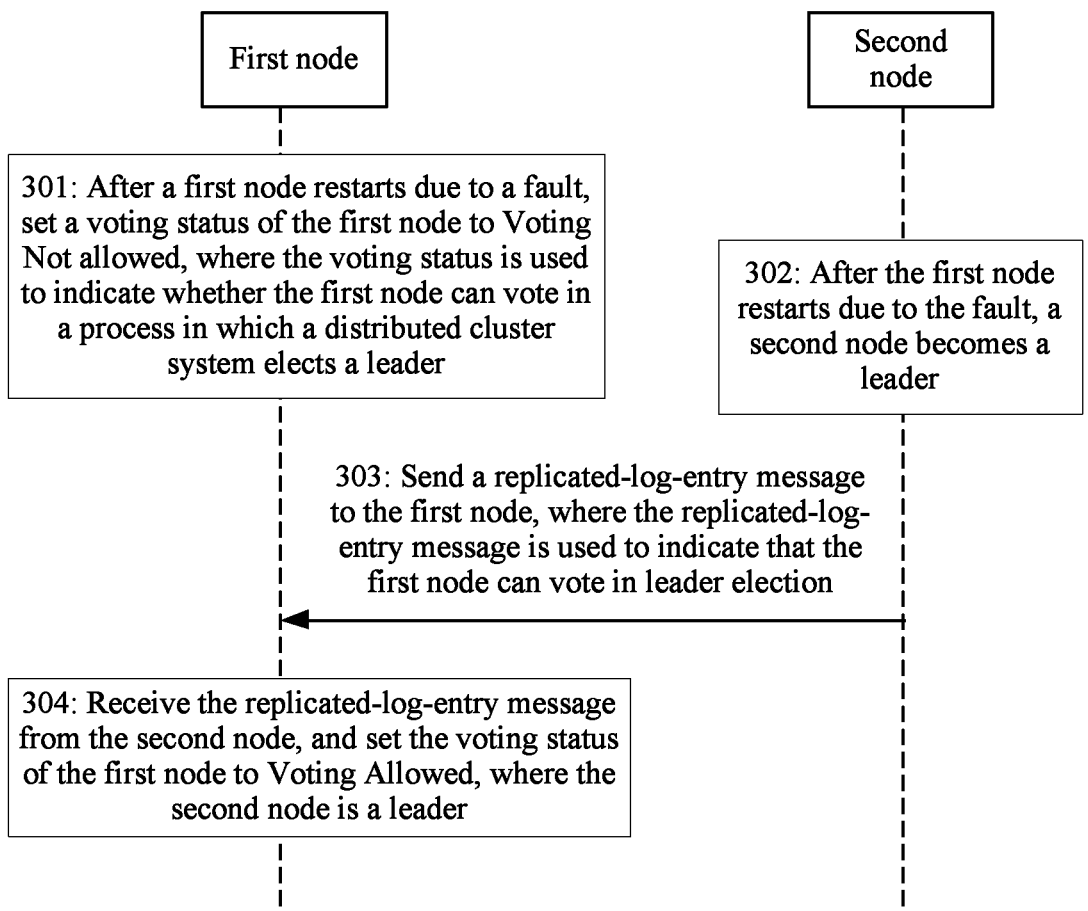
FIG. 3 is a schematic diagram of procedure interaction of a fault rectification method according to an embodiment of the present disclosure.

FIG. 3 is a schematic flowchart of a fault rectification method according to an embodiment of the present disclosure. The method is applied to a distributed cluster system that is based on a Raft algorithm and that is shown in FIG. 1. A quantity of nodes that have a latest log and that are included in the distributed cluster system possibly causes a problem that a node that does not have the latest log is elected as a leader after one of the nodes that have the latest log restarts due to a fault, the distributed cluster system includes at least a first node, a second node, and a third node, the first node and the second node have the latest log before the fault occurs, and the third node does not have the latest log before the fault occurs. For example, the method may be applied to two scenarios shown in FIG. 2A and FIG. 2B. It should be noted that FIG. 1, FIG. 2A, and FIG. 2B only use an example in which a quantity of nodes in a Raft cluster is 3 for description. In an actual application scenario, a quantity of nodes may be greater than or equal to 3, and principles thereof are the same. For brevity, details are not described.

A solution provided by this embodiment of the present disclosure includes a 301 part, a 302 part, a 303 part, and a 304 part. The 301 part and the 302 part are executed on the first node, and the 303 part and the 304 part are executed on the second node, which are separately described below.

In the 301 part, after the first node restarts due to the fault, the first node sets a voting status of the first node to Voting Not Allowed, where the voting status is used to indicate whether the first node can vote in a process in which the distributed cluster system elects a leader.

Optionally, a determining condition of setting a voting status of the first node to Voting Not Allowed may be: after the first node starts up and it is determined that a reason why a log of the first node is empty is that the restart due to the fault results in a log loss, setting the voting status to Voting Not Allowed. In addition, if it is determined that the reason why a log of the first node is empty is that the first node starts up for the first time, the voting status is set to Voting Allowed.

The voting status is set to Voting Not Allowed only after it is determined that the reason why a log of the first node is empty is that the restart due to the fault results in a log loss. This ensures that if the system is initializing, the voting status of the first node is not set to Voting Not Allowed, thereby avoiding error occurrence.

Further, optionally, a method for determining the reason why a log of the first node is empty may be implemented by storing second identification information in a non-volatile storage medium of the first node.

The second identification information is stored in the non-volatile storage medium, such that the embodiments of the present disclosure provide a simpler and more secure method to ensure that the voting status is correctly identified and set, avoiding a case in which the system cannot operate normally due to incorrect identification.

The second identification information is used to indicate whether the first node has received a first log before from another node in the distributed cluster system or from a client device. For example, when the Raft cluster initially starts up, the log of the first node is empty (has never received a log previously), and the second identification information is 0, representing false and used to indicate that the first node has not received the first log from another node in the distributed cluster system or from a client device. The client device is a client node that is not within the Raft cluster, and may be a network forwarding device, such as a router or a switch, or may be a device such as an application server. When the first node receives the first log from another node (for example, the second node) in the distributed cluster system or from a client device in an operating process of the Raft cluster, the second identification information is set to 1, representing true and used to indicate that the first node has received the first log before from the other node in the distributed cluster system or from the client device.

After the first node restarts due to the fault, if the first node confirms that the second identification information is 1 (that is, True) and that a log stored in a memory of the first node is empty, the first node determines that the first node loses the log because of the restart due to the fault.

After the first node restarts due to the fault, if the first node confirms that the second identification information is 0 (that is, False) and that a log stored in a memory of the first node is empty, the first node determines that the log is empty because the first node starts up for the first time. That is, because when the Raft cluster initially starts up, all nodes in the cluster start up for the first time, the log in the memory is empty.

The second identification information is set to false or true, such that this embodiment of the present disclosure provides a more concise and specific manner of configuring the second identification information.

In conclusion, setting the voting status of the first node that restarts due to the fault to Voting Not Allowed ensures that the third node that does not have the latest log before the fault occurs cannot be elected as a leader in leader election of the Raft cluster, and that the second node that has the latest log before the fault occurs can be elected as the new leader, such that the latest log before the fault occurs can be released (or synchronized) to another node in the Raft cluster, and the latest log before the fault occurs is not lost in the Raft cluster, thereby improving security of the Raft cluster. The following uses an example for description.

Figure 4A:
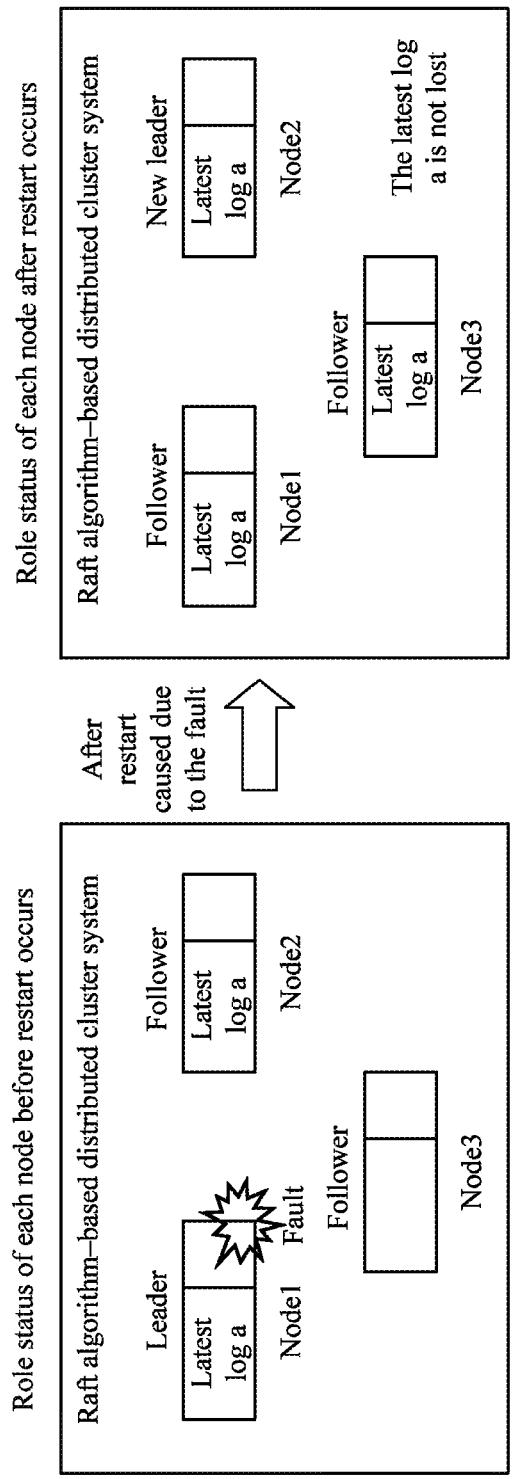
FIG. 4A is a schematic diagram of a distributed system and problem resolving according to an embodiment of the present disclosure.

For the technical problem shown in FIG. 2A, with reference to FIG. 4A, after the Node1 that serves as a leader restarts due to a fault, it is determined that the restart due to the fault results in an empty log. Therefore, the Node1 cannot participate in voting in a leader election process. In this case, if the Node3 initiates a vote request, the Node3 can neither obtain a yes vote from the Node1 nor obtain a yes vote from the Node2 (for details, refer to the foregoing description part of the technical problem shown in FIG. 2A), and can obtain only one yes vote from itself. Because one vote is less than a half of votes (1.5 votes) of the Raft cluster, the Node3 cannot be elected as a leader. If the Node2 initiates a vote request, the Node2 can obtain one vote from itself and one vote from the Node3 (for details about a principle for voting yes by the Node3, refer to the foregoing description part of the technical problem shown in FIG. 2A). There are a total of two votes, and the two votes are greater than a half of votes (1.5 votes). Therefore, the Node2 is elected as a leader, and synchronizes the latest log a to the Node1 and the Node3. As a result, the latest log a is not lost when the Node1 restarts due to the fault.

Figure 4B:
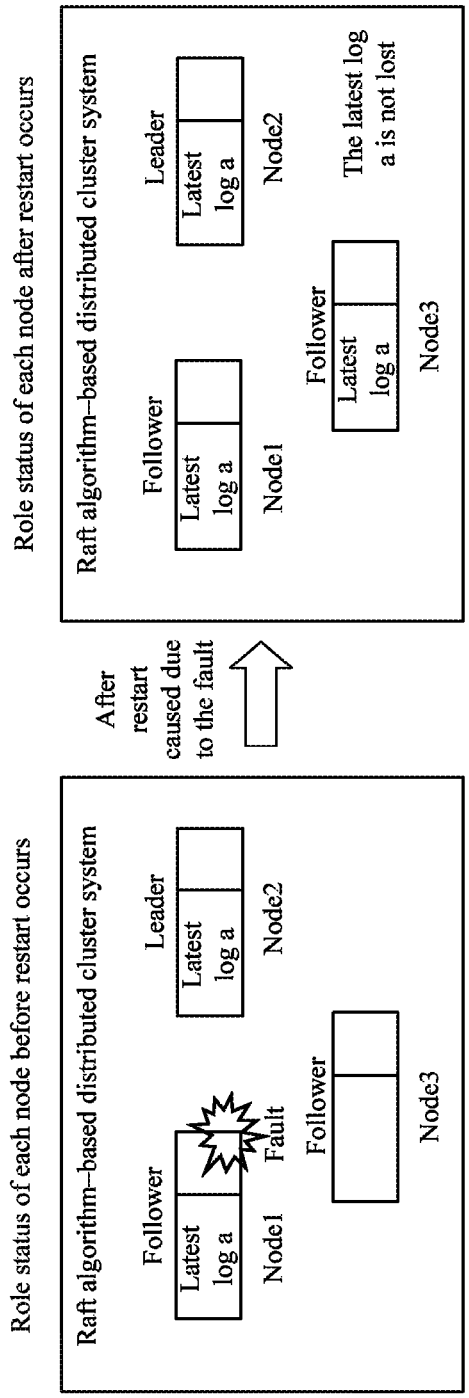
FIG. 4B is a schematic diagram of a distributed system and problem resolving according to an embodiment of the present disclosure.

For the technical problem shown in FIG. 2B, with reference to FIG. 4B, after the Node1 that serves as a follower restarts due to a fault, it is determined that the restart due to the fault results in an empty log. Therefore, the Node1 cannot participate in voting in a leader election process. After the Node1 restarts, the Raft cluster is exactly in the leader election process. In this case, if the Node3 initiates a vote request, the Node3 can neither obtain a yes vote from the Node1 nor obtain a yes vote from the Node2 (for details, refer to the foregoing description part of the technical problem shown in FIG. 2B), and can obtain only one yes vote from itself. Because one vote is less than a half of votes (1.5 votes) of the Raft cluster, the Node3 cannot be elected as a leader. If the Node2 initiates a vote request, the Node2 can obtain one vote from itself and one vote from the Node3 (because the Node2 has the latest log a, the lastLogIndex of the Node2 is greater than the lastLogIndex of the Node3, and the Node3 votes yes for the Node2; and for details about a principle, refer to the foregoing description part of the technical problem shown in FIG. 2A or FIG. 2B). There are a total of two yes votes, and the two votes are greater than a half of votes (1.5 votes). Therefore, the Node2 is elected as a leader, and synchronizes the latest log a to the Node1 and the Node3. As a result, the latest log a is not lost when the Node1 restarts due to the fault.

In the 302 part, after the first node restarts due to the fault, the second node becomes a leader. For example, after the first node restarts due to the fault, the second node obtains more than half of yes votes in the distributed cluster system and becomes the new leader. The more than half of yes votes include a yes vote from the second node itself and a yes vote from the third node, and the second node cannot obtain a yes vote from the first node.

The first node is set to being unable to participate in voting in leader election, such that the third node that does not have the latest log before the fault occurs cannot be elected as a leader, thereby ensuring that the second node that has the latest log before the fault occurs can be smoothly elected as the leader.

Further, that the second node becomes a leader includes the following three cases, and examples are used below for description.

In a first case, in a scenario shown in FIG. 2A, after the Node1 that serves as a leader restarts due to a fault, the Node2 that serves as a follower is elected as a new leader. For example, when the Node1 is faulty, the Node2 and the Node3 cannot receive a heartbeat sent by the Node1 that serves as a leader. When an election timer expires, a new round of leader election is caused, and the Node2 becomes the new leader.

In a second case, in a scenario shown in FIG. 2B, when the Node1 that serves as a follower restarts due to a fault, the Raft cluster is performing a new round (that is, a new term, with a corresponding variable currentTerm+1) of leader election, and the Node2 that serves as a leader becomes the new leader by means of the new round of election.

In the foregoing two cases, the new leader elected by the Raft cluster after the Node1 restarts due to the fault sends a replicated-log-entry message to the Node1, such that a voting right of the Node1 is restored. This ensures that if the Raft cluster performs a new round of leader election when the Node1 restarts due to a fault, the system can still operate normally, further improving security of the system.

In a third case, in the scenario shown in FIG. 2B, when the Node1 that serves as a follower restarts due to a fault, the Raft cluster does not perform a new round of leader election, and the Node2 that serves as a leader continues to serve as the leader (that is, the leader of the distributed cluster system before the first node restarts due to the fault). The leader in this case may also be considered as an old leader before the first node restarts due to the fault. The old leader sends a replicated-log-entry message that is to be described below to the Node1, such that a voting right of the Node1 is restored. This ensures that if the Raft cluster does not perform a new round of leader election when the Node1 restarts due to a fault, the system can still operate normally, improving security of the system.

In the 303 part, the second node sends a replicated-log-entry message to the first node, where the replicated-log-entry message is used to indicate that the first node can vote in leader election.

In the 304 part, the first node receives the replicated-log-entry message from the second node, and sets the voting status of the first node to Voting Allowed, where the second node is a leader.

For brevity, the 303 part and the 304 part are described together. The replicated-log-entry message includes a log entry. The second node that serves as the leader synchronizes all of its own log entries to the first node. A quantity of replicated-log-entry messages may be equal to a quantity of log entries, or may be less than a quantity of log entries. For example, the quantity of log entries is M, the quantity of replicated-log-entry messages is N, N is less than or equal to M, and N and M are positive integers greater than or equal to 1. When N is equal to M, it indicates that each replicated-log-entry message includes one log entry. When N is less than M, it indicates that each replicated-log-entry message includes multiple log entries (that is, a group of log entries) or one log entry. As shown in FIG. 4A or FIG. 4B, if the log entry includes the latest log a, the Node1 receives and stores the latest log a synchronized from the Node2, such that the latest log a is not lost after the Node1 restarts due to a fault.

A time at which the first node sets the voting status of the first node to Voting Allowed may include the following several cases.

In a first case, it is assumed that an $N^{th}$ replicated-log-entry message includes the latest log before the fault occurs, and that when receiving an $X^{th}$ replicated-log-entry message (X is a positive integer that is greater than or equal to 1 but is less than N) sent by the second node, the first node sets the voting status to Voting Allowed and restores a voting right in leader election. That is, when the latest log before the fault occurs has not been synchronized to the first node, the voting right of the first node is restored. In this case, if the second node is faulty, the latest log before the fault occurs is lost. In addition, because the first node already has the voting right, in a process of a new round of leader election, the first node votes yes for another node, for example, for the third node. As a result, the third node becomes a new leader. The Raft cluster continues operating, but cannot identify that the log is already lost, resulting in a security risk. Certainly, if the second node is not faulty, after the voting right is restored, the second node continues to synchronize, to the first node, the latest log before the fault occurs. Therefore, the latest log before the fault occurs is not lost, and no security risk occurs.

In a second case, it is assumed that the $N^{th}$ replicated-log-entry message includes the latest log before the fault occurs, and that when receiving the $X^{th}$ replicated-log-entry message (X is a positive integer that is equal to N) sent by the second node, the first node sets the voting status to Voting Allowed and restores a voting right in leader election. That is, when the latest log before the fault occurs has been synchronized to the first node, the voting right of the first node is restored. In this case, if the second node is faulty, the latest log before the fault occurs is not lost, and no security risk occurs.

It can be learned from the foregoing that, according to the foregoing method for restoring, after receiving a replicated-log-entry message, a voting right of a node that restarts due to a fault, there is still a security risk in the foregoing first case.

In view of this, first identification information is added to the replicated-log-entry message in the present disclosure. The first identification information is used to indicate whether the log entry carried in the replicated-log-entry message includes a last log before the second node becomes the new leader.

When the first identification information indicates that the log entry does not include the last log before the second node becomes the leader, the replicated-log-entry message is used to instruct the first node to store the log entry and not to change the voting status of the first node. That is, the voting right of the first node is not restored. The first identification information is used to indicate that the log entry does not include the last log before the second node becomes the leader, such that a normal operation is still performed when a log other than the latest log before the fault occurs (that is, an old log before the fault occurs) is synchronized according to the replicated-log-entry message.

When the first identification information indicates that the log entry includes the last log before the second node becomes the leader, the replicated-log-entry message is used to instruct the first node to store the log entry and set the voting status of the first node to Voting Allowed.

The last log before the second node becomes the leader may be the latest log before the fault occurs, or may be a new log that is newly received after the fault occurs. The following separately provides descriptions using examples.

First, an example is used to describe that the last log before the second node becomes the leader is the latest log before the fault occurs. For example, as shown in FIG. 4A or FIG. 4B, after the Node1 restarts due to a fault, if the last log before the Node2 becomes an elected new leader is the latest log a, the Node2 sends a ReplicatedLogEntry message Y to the Node1. The ReplicatedLogEntry message Y includes the latest log a and a first identification information a. The first identification information a indicates that the latest log a is the last log before the Node2 becomes the leader. After receiving the ReplicatedLogEntry message Y, the Node1 confirms, according to the first identification information a, that the Node1 receives the latest log a, and then the Node1 stores the latest log a, and sets a voting status of the Node1 to Voting Allowed, to restore a voting right of the Node1.

Then, an example is used to describe that the last log before the second node becomes the leader is a new log that is newly received after the fault occurs. For example, as shown in FIG. 4B, the Node2 serves as a leader, and when the Node1 restarts due to a fault, receives a log b sent by a client device. Then, the Raft cluster initiates a new round of leader election. After the Node1 restarts due to the fault, the Node2 continues to become a leader by means of the new round of leader election. The log b is the last log before the Node2 becomes the elected new leader. The Node2 sends a ReplicatedLogEntry message Y to the Node1. The ReplicatedLogEntry message Y includes the latest log a and the first identification information a. The first identification information a indicates that the latest log a is not the last log before the Node2 becomes the leader. After receiving the ReplicatedLogEntry message Y, the Node1 stores the latest log a, and does not set a voting status of the Node1 to Voting Allowed, that is, does not restore a voting right of the Node1. The Node2 continues to send a ReplicatedLogEntry message Z to the Node1. The ReplicatedLogEntry message Z includes the log b and a first identification information b. The first identification information b indicates that the log b is the last log before the Node2 becomes the leader. After receiving the ReplicatedLogEntry message Z, the Node1 stores the log b, and sets the voting status of the Node1 to Voting Allowed, that is, restores the voting right of the Node1. It should be noted that the log b is merely an example. When restarting due to the fault, the Node1 may further receive multiple new logs in addition to the log b, for example, a log c and a log d. This is not limited herein. In this case, a principle is the same as that in the foregoing, and details are not described herein again.

In this way, it is ensured that the voting right of the Node1 can be restored only after the Node1 receives the latest log a. When the Node1 does not receive the latest log a, the voting right of the Node1 cannot be restored. In this case, when the Node2 also restarts due to a fault, the Node3 node cannot be elected as a leader (because of being unable to obtain yes votes from the Node1 and the Node2). As a result, the Raft cluster cannot elect a leader, and accordingly identifies a log loss, performs fault reporting, and notifies an administrator of quickly rectifying the fault, thereby avoiding an security risk that is caused when the Raft cluster still continues operating when losing the log.

By adding the first identification information to the replicated-log-entry message, the voting right of the first node is restored only after it is ensured that the first node has received the latest log before the fault occurs, thereby avoiding a security risk problem that is caused when the Raft cluster still continues operating because of being unable to identify that the log is already lost.

Figure 5A:
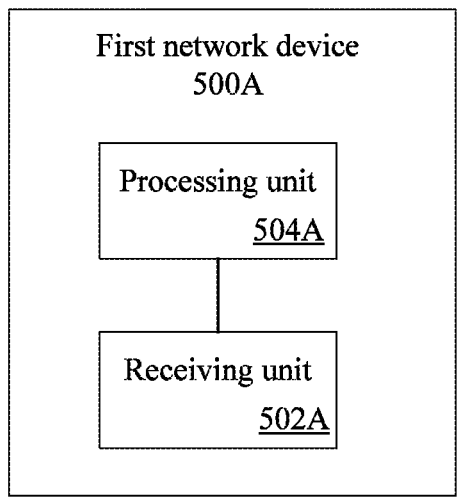
FIG. 5A is a schematic structural diagram of a first network device according to an embodiment of the present disclosure.

FIG. 5A shows a possible schematic structural diagram of a first network device to which the foregoing embodiment relates. The first network device 500A serves as a first node and is applied to a distributed cluster system, where a quantity of nodes that have a latest log and that are included in the distributed cluster system possibly causes a problem that a node that does not have the latest log is elected as a leader after one of the nodes that have the latest log restarts due to a fault, the distributed cluster system includes at least the first node, a second node, and a third node, the first node and the second node have the latest log before the fault occurs, the third node does not have the latest log before the fault occurs, and the first network device 500A includes: a processing unit 504A configured to set, after the first node restarts due to the fault, a voting status of the first node to Voting Not Allowed, where the voting status is used to indicate whether the first node can vote in a process in which the distributed cluster system elects a leader; and a receiving unit 502A configured to receive a replicated-log-entry message from the second node, where the second node is a leader, where the processing unit 504A is further configured to set, according to the replicated-log-entry message, the voting status of the first node to Voting Allowed.

Optionally, the second node is a new leader elected by the distributed cluster system after the first node restarts due to the fault. The replicated-log-entry message includes a log entry and first identification information, where the first identification information is used to indicate whether the log entry includes a last log before the second node becomes the new leader. The processing unit 504A confirms, according to the first identification information, that the log entry includes the last log before the second node becomes the new leader, stores the log entry, and sets the voting status of the first node to Voting Allowed.

The first network device 500A further includes a volatile storage unit, where the volatile storage unit is configured to store the log entry.

Optionally, the processing unit 504A is further configured to: confirm, according to the first identification information, that the log entry does not include the last log before the second node becomes the leader; store the log entry; and retain the voting status of the first node as Voting Not Allowed.

Optionally, after the first node starts up, the processing unit 504A determines that a reason why a log of the first node is empty is that the restart due to the fault results in a log loss, and sets the voting status to Voting Not Allowed.

Further, optionally, the first node further includes a non-volatile storage unit, and the non-volatile storage unit stores second identification information, where the second identification information is used to indicate whether the first node has received a first log before from another node in the distributed cluster system or from a client device. When the first node starts up, the processing unit 504A is configured to confirm that the second identification information indicates that the first node has received the first log before and that a current log of the first node is empty; and the processing unit 504A is configured to determine that the first node loses the log because of the restart due to the fault.

The first network device 500A in this embodiment of the present disclosure may implement various implementation functions and steps in the first nodes in embodiments corresponding to the foregoing FIG. 2A to FIG. 4B. For brevity, details are not described herein again.

Figure 5B:
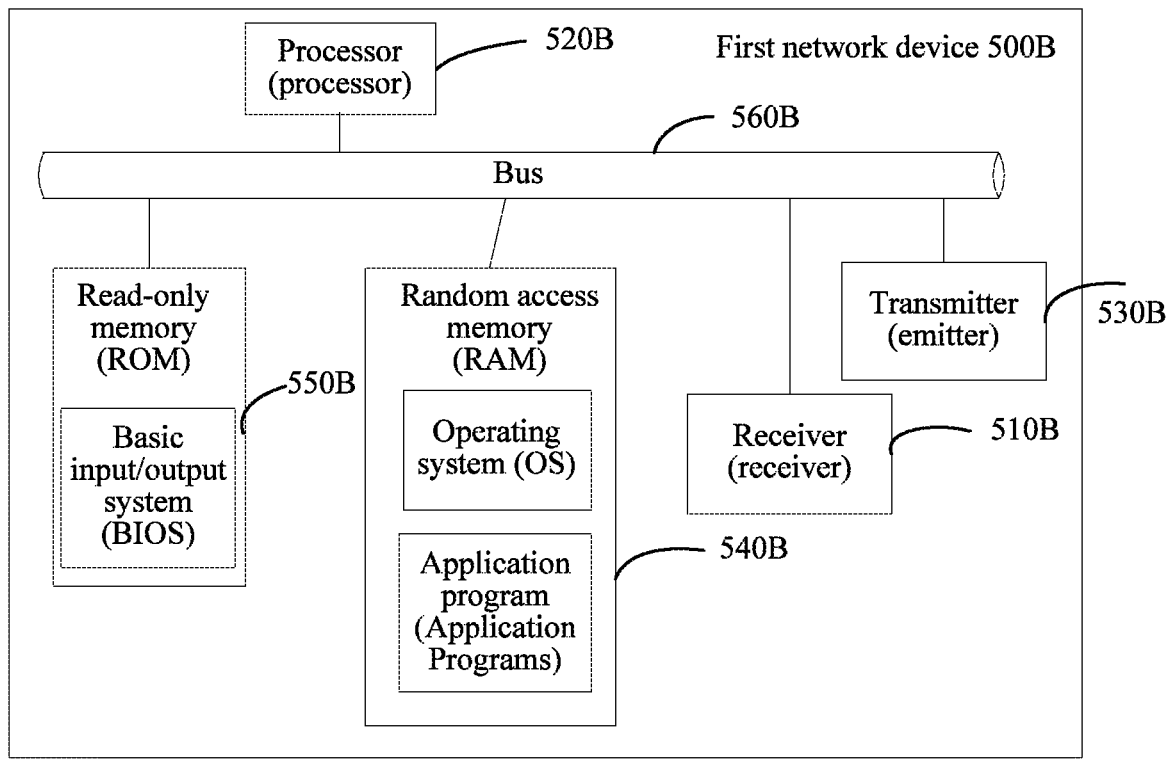
FIG. 5B is a schematic structural diagram of another first network device according to an embodiment of the present disclosure.

FIG. 5B shows another possible schematic structural diagram of a first network device to which the foregoing embodiment relates. The first network device 500B includes: a receiver 510B, a processor 520B, a transmitter 530B, a random access memory 540B, a read-only memory 550B, and a bus 560B. The processor 520B is coupled to the receiver 510B, the transmitter 530B, the random access memory 540B, and the read-only memory 550B using the bus 560B. When it is required to run the first network device 500 B, the first network device 500 B is started using a basic input/output system built in the read-only memory 550B or using a bootloader boot system in an embedded system, to boot the first network device 500B to a normal running state. After the first network device 500B enters a normal running state, an application and an operating system run in the random access memory 540B, such that: the processor 520B sets, after a first node restarts due to a fault, a voting status of the first node to Voting Not Allowed, where the voting status is used to indicate whether the first node can vote in a process in which the distributed cluster system elects a leader; and the receiver 510B receives a replicated-log-entry message from a second node, where the second node is a leader, and the processor 520B further sets, according to the replicated-log-entry message, the voting status of the first node to Voting Allowed.

The first network device 500B in this embodiment of the present disclosure may be corresponding to the first nodes in embodiments corresponding to the foregoing FIG. 2A to FIG. 4B. In addition, the processor 520B, the receiver 510B, and the like of the first network device 500B may implement functions of and/or various steps and methods implemented by the first nodes in the embodiments corresponding to FIG. 2A to FIG. 4B. The processor 520B is configured to execute all operations of the processing unit 504A of the first network device in FIG. 5A. The receiver 510B is configured to execute all operations of the receiving unit 502A of the first network device in FIG. 5A. The random access memory 540B is configured to execute all operations of the volatile storage unit in FIG. 5A. The read-only memory 550B is configured to execute all operations of the non-volatile storage unit in FIG. 5A. For brevity, details are not described herein again.

It should be noted that this embodiment may also be based on a virtual first network device that is implemented by a general physical server in combination with a Network Function Virtualization (NFV) technology. The virtual first network device may be a virtual machine (VM) that runs a program used for a fault rectification function. The virtual machine is deployed on a hardware device (for example, a physical server). The virtual machine is a complete software-simulated computer system that has complete hardware system functions and that runs in a completely isolated environment.

Figure 6A:
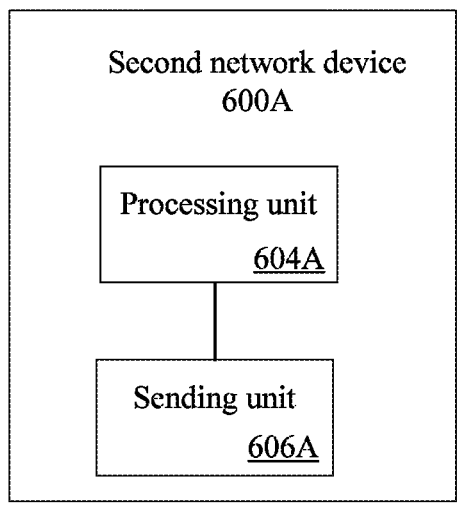
FIG. 6A is a schematic structural diagram of a second network device according to an embodiment of the present disclosure.

FIG. 6A shows a possible schematic structural diagram of a second network device to which the foregoing embodiment relates. The second network device 600A serves as a second node and is applied to a distributed cluster system, where a quantity of nodes that have a latest log and that are included in the distributed cluster system possibly causes a problem that a node that does not have the latest log is elected as a leader after one of the nodes that have the latest log restarts due to a fault, the distributed cluster system includes at least a first node, the second node, and a third node, the first node and the second node have the latest log before the fault occurs, the third node does not have the latest log before the fault occurs, and the second network device 600A includes: a processing unit 604A configured to: after the first node restarts due to the fault, confirm that the second node is a leader; and a sending unit 606A configured to send a replicated-log-entry message to the first node, where the replicated-log-entry message is used to indicate that the first node can vote in leader election.

Optionally, the processing unit 604A is configured to confirm that the second node is a new leader elected by the distributed cluster system after the first node restarts due to the fault. The replicated-log-entry message includes a log entry and first identification information, where the first identification information is used to indicate whether the log entry includes a last log before the second node becomes the new leader. A definition and a description of the first identification information are the same as descriptions in the method embodiments in FIG. 2A to FIG. 4B. For brevity, details are not described herein again.

Optionally, the second network device 600A further includes a non-volatile storage unit, and the non-volatile storage unit stores second identification information, where the second identification information is used to indicate whether the second node has received a first log before from another node in the distributed cluster system or from a client device. When the second node starts up, the processing unit 604A is configured to confirm that the second identification information indicates that the second node has received the first log before and that a current log of the second node is empty; and the processing unit 604A is configured to determine that the second node loses the log because of the restart due to the fault.

The second network device 600A in this embodiment of the present disclosure may implement various implementation functions and steps in the second nodes in embodiments corresponding to the foregoing FIG. 2A to FIG. 4B. For brevity, details are not described herein again.

Figure 6B:
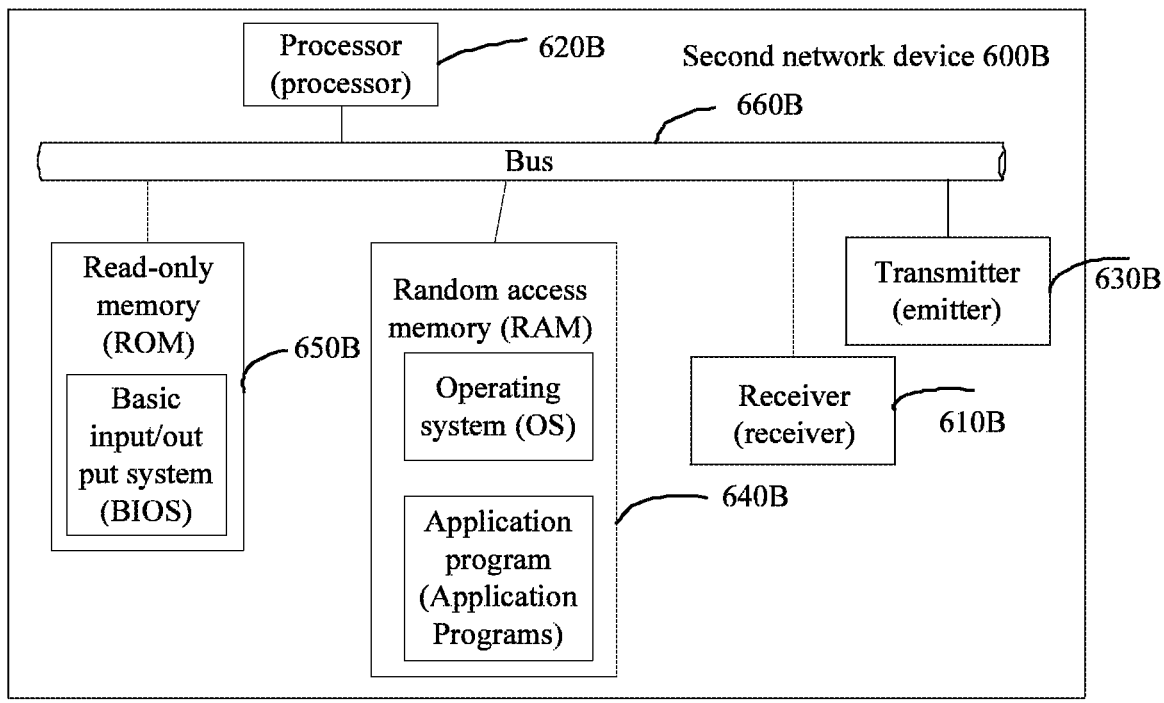
FIG. 6B is a schematic structural diagram of another second network device according to an embodiment of the present disclosure.

FIG. 6B shows another possible schematic structural diagram of a second network device to which the foregoing embodiment relates. The second network device 600B includes: a receiver 610B, a processor 620B, a transmitter 630B, a random access memory 640 B, a read-only memory 650 B, and a bus 660 B. The processor 620 B is coupled to the receiver 610 B, the transmitter 630 B, the random access memory 640 B, and the read-only memory 650 B using the bus 660 B. When it is required to run the second network device 600 B, the second network device 600 B is started using a basic input/output system built in the read-only memory 650 B or using a bootloader boot system in an embedded system, to boot the second network device 600 B to a normal running state. After the second network device 600 B enters a normal running state, an application and an operating system run in the random access memory 640 B, such that: the processor 620B is configured to confirm, after a first node restarts due to a fault, that a second node is a leader; and the transmitter 630B is configured to send a replicated-log-entry message to the first node, where the replicated-log-entry message is used to indicate that the first node can vote in leader election.

The second network device 600B in this embodiment of the present disclosure may be corresponding to the second nodes in embodiments corresponding to the foregoing FIG. 2A to FIG. 4B. In addition, the processor 620B, the transmitter 630B, and the like of the second network device 600B may implement functions of and/or various steps and methods implemented by the second nodes in the embodiments corresponding to FIG. 2A to FIG. 4B. The processor 620B is configured to execute all operations of the processing unit 604A of the second network device in FIG. 6A. The transmitter 630B is configured to execute all operations of the sending unit 606A of the second network device in FIG. 6A. The read-only memory 650B is configured to execute all operations of the non-volatile storage unit in FIG. 6A. For brevity, details are not described herein again.

It should be further noted that the first network device or the second network device in the embodiments of the present disclosure may be various types of devices with computing and storage capabilities, for example, computer devices such as servers, hosts, or PCs (personal computers). For another example, a network device may alternatively be a Software Defined Network (SDN) controller.

Figure 7:
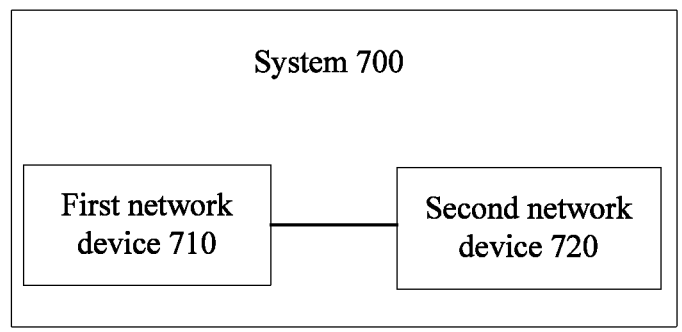
FIG. 7 is a schematic diagram of a system according to an embodiment of the present disclosure.

FIG. 7 is a schematic diagram of a fault rectification system according to an embodiment of the present disclosure. As shown in FIG. 7, the system 700 includes a first network device 710 and a second network device 720. The first network device 710 is any first network device described above in FIG. 5A and FIG. 5B, and the second network device 720 is any second network device described above in FIG. 6A and FIG. 6B. For a detailed description about each device in the system, refer to relevant sections described above in FIG. 5A to FIG. 5B, FIG. 6A to FIG. 6B, and the like. Details are not described herein again.

It should be understood that a person skilled in the art can obtain, on a basis of reading this application, combinations of optional features, steps, or methods described in embodiments of this application without creative efforts, and all of the combinations belong to the embodiments disclosed in this application. For simple description or writing, different combinations are not described.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, multiple units or components may be combined or integrated into another system, or some features may be ignored or not performed. In addition, the displayed or discussed mutual couplings or direct couplings or communications connections may be implemented using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present disclosure, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), or a magnetic disk.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A fault rectification method applied to a distributed cluster system, wherein the distributed cluster system comprises at least a first node, a second node, and a third node, wherein the first node and the second node have a latest log before a fault occurs, wherein the third node does not have the latest log before the fault occurs, and wherein the method comprises:
    setting a voting status of the first node to a Voting Not Allowed state after the first node restarts due to the fault, wherein the voting status indicates whether the first node is able to vote in a process in which the distributed cluster system performs a leader election; and
    receiving, by the first node, a replicated-log-entry message from the second node; and
    setting the voting status of the first node to a Voting Allowed state,
    wherein the second node is a leader of the distributed cluster system.

2. The method according to claim 1, wherein the second node is a new leader elected by the distributed cluster system after the first node restarts due to the fault, and wherein setting the voting status of the first node to the Voting Not Allowed state after the first node restarts due to the fault ensures that the third node cannot be elected as leader in the leader election.

3. The method according to claim 2, wherein receiving the replicated-log-entry message from the second node and setting the voting status of the first node to the Voting Allowed state comprises:
    receiving the replicated-log-entry message, wherein the replicated-log-entry message comprises a log entry and first identification information, and wherein the first identification information indicates whether the log entry comprises a last log before the second node becomes the new leader;
    confirming, by the first node according to the first identification information, that the log entry comprises the last log before the second node becomes the new leader;
    storing the log entry; and
    setting the voting status of the first node to the Voting Allowed state.

4. The method according to claim 3, further comprising:
    confirming, by the first node according to the first identification information, that the log entry does not comprise the last log before the second node becomes the leaden;
    storing the log entry; and
    retaining the voting status of the first node as the Voting Not Allowed state.

5. The method according to claim 3, wherein setting, by the first node after the first node restarts due to the fault, the voting status of the first node to the Voting Not Allowed state comprises:
    determining, after the first node starts up, that a reason why a log of the first node is empty is that the restart due to the fault results in a log loss; and
    setting the voting status of the first node to the Voting Not Allowed state.

6. The method according to claim 5, wherein determining that a reason why a long of the first node is empty is that the restart due to the fault results in a long loss comprises:
    storing, by the first node, second identification information in a non-volatile storage medium, wherein the second identification information indicates whether the first node has previously received a first log from another node in the distributed cluster system or from a client device;
    confirming, by the first node when the first node starts up, that the second identification information indicates that the first node has previously received the first log and that a current log of the first node is empty; and
    determining, by the first node, that the first node lost the log because of the restart due to the fault.

7. A fault rectification method applied to a distributed cluster system
    that comprises at least a first node, a second node, and a third node, wherein the first node and the second node have a latest log before a fault occurs, wherein the third node does not have the latest log before the fault occurs, and wherein the method comprises:
    electing the second node to be a leader of the distributed cluster system after the first node restarts due to the fault; and
    sending, by the second node, a replicated-log-entry message to the first node, wherein the replicated-log-entry message indicates that the first node is eligible to vote in a leader election.

8. The method according to claim 7, wherein the second node is a new leader elected by the distributed cluster system after the first node restarts due to the fault.

9. The method according to claim 8, wherein the replicated-log-entry message comprises a log entry and first identification information, wherein the first identification information indicates whether the log entry comprises a last log before the second node becomes the new leader, and wherein the replicated-log-entry message instructs the first node to store the log entry and set a voting status of the first node to a Voting Allowed state when the first identification information indicates that the log entry comprises the last log before the second node becomes the leader.

10. The method according to claim 9, wherein the replicated-log-entry message instructs the first node to store the log entry and not to change the voting status of the first node when the first identification information indicates that the log entry does not comprise the last log before the second node becomes the leader.

11. A first network device; serving as a first node in a distributed cluster system, wherein the distributed cluster system comprises at least the first node, a second node, and a third node, wherein the first node and the second node have a latest log before a fault occurs, wherein the third node does not have the latest log before the fault occurs, and wherein the first node comprises:
- a processor configured to set, after the first node restarts due to the fault, a voting status of the first node to a Voting Not Allowed state, wherein the voting status indicates whether the first node is eligible to vote in a process in which the distributed cluster system performs a leader election; and
- a receiver unit coupled to the processor and; configured to receive a replicated-log-entry message from the second de, wherein the second node is a leader, and wherein the processor is further configured to set, according to the replicated-log-entry message, the voting status of the first node to a Voting Allowed state.

12. The first node according to claim 11, wherein the second node is a new leader elected by the distributed cluster system after the first node restarts due to the fault, and wherein setting the voting status of the first node to the Voting Not Allowed state after the first node restarts due to the fault ensures that the third node cannot be elected as leader in the leader election.

13. The first node according to claim 12, wherein the replicated-log-entry message comprises a log entry and first identification information, the first identification information indicating whether the log entry comprises a last log before the second node becomes the new leader, and wherein the processor being further configured to set, according to the replicated-log-entry message, the voting status of the first node to the Voting Allowed state is such that the processor is configured to:
- confirm, according to the first identification information, that the log entry comprises the last log before the second node becomes the new leader;
- store the log entry in a volatile storage unit of the first node; and
- set the voting status of the first node to the Voting Allowed state.

14. The first node according to claim 13, wherein the processor is further configured to:
- confirm, according to the first identification information, that the log entry does not comprise the last log before the second node becomes the leader;
- store the log entry; and
- retain the voting status of the first node as the Voting Not Allowed state.

15. The first node according to claim 11, wherein the processor being configured to set, after the first node restarts due to the fault, the voting status of the first node to the Voting Not Allowed state is such that after the first node starts up, the processor is configured to:
- determine that a reason why a log of the first node is empty is that the restart due to the fault results in a log loss; and
- set the voting status to the Voting Not Allowed state.

16. The first node according to claim 15, wherein the first node further comprises a non-volatile storage unit configured to store second identification information, wherein the second identification information indicates whether the first node has previously received a first log from another node in the distributed cluster system or from a client device, wherein the processor being configured to determine that the reason why the log of the first node is empty is such that when the first node starts up, the processor is configured to:
- confirm that the second identification information indicates that the first node has previously received the first log and that a current log of the first node is empty; and
- determine that the first node loses the log because of the restart due to the fault.

17. A second network device serving as a second node in a distributed cluster system, wherein the distributed cluster system comprises at least a first node, the second node, and a third node, wherein the first node and the second node have a latest log before a fault occurs, wherein the third node does not have the latest log before the fault occurs, and wherein the second node comprises:
- a processor configured to confirm that the second node is a leader after the first node restarts due to the fault; and
- a transmitter coupled to the processor and configured to send a replicated-log-entry message to the first node, wherein, the replicated-log-entry message indicates that the first node is eligible to vote in leader election.

18. The second node according to claim 17, wherein the processor is configured to confirm that the second node is a new leader elected by the distributed cluster system after the first node restarts due to the fault.

19. The second node according to claim 18, wherein the replicated-log-entry message comprises a log entry and first identification information, wherein the first identification information indicates whether the log entry comprises a last log before the second node becomes the new leader, and when the first identification information indicates that the log entry comprises the last log before the second node becomes the leader, the replicated-log-entry message instructs the first node to store the log entry and set a voting status of the first node to a Voting Allowed state.

20. The second node according to claim 19, wherein the replicated-log-entry, message instructs the first node to store the log entry and not to change the voting status of the first node when the first identification information indicates that the log entry does not comprise the last log before the second node becomes the leader.

* * * * *

UNITED STATES PATENT AND TRADEMARK OFFICE
CERTIFICATE OF CORRECTION

PATENT NO. : 11,102,084 B2
APPLICATION NO. : 16/456679
DATED : August 24, 2021
INVENTOR(S) : Jie Hou, Yuezhong Song and Chengyong Lin Page 1 of 1

It is certified that error appears in the above-identified patent and that said Letters Patent is hereby corrected as shown below:

In the Claims

Claim 4, Column 22, Line 5: "leaden;" should read "leader;"

Claim 5, Column 22, Line 9: "claim 3," should read "claim 1,"

Claim 6, Column 22, Line 19: "why a long of the" should read "why a log of the"

Claim 6, Column 22, Line 20: "in a long loss" should read "in a log loss"

Claim 11, Column 22, Line 66: "network device; serving as" should read "network device serving as"

Claim 11, Column 23, Line 12: "processor and; configured to" should read "processor and configured to"

Claim 11, Column 23, Line 14: "de; wherein" should read "node; wherein"

Claim 17, Column 24, Line 31: "wherein, the" should read "wherein the"

Claim 20, Column 24, Line 47: "entry, message instructs" should read "entry message instructs"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*